(12) United States Patent
Matsuo et al.

(10) Patent No.: US 9,372,363 B2
(45) Date of Patent: Jun. 21, 2016

(54) METHOD FOR MANUFACTURING PHOTO-RESPONSIVE CROSS-LINKED LIQUID-CRYSTALLINE POLYMER FILM

(71) Applicant: Nitto Denko Corporation, Osaka (JP)

(72) Inventors: Naoyuki Matsuo, Osaka (JP); Takeshi Sutou, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 0 days.

(21) Appl. No.: 14/605,277

(22) Filed: Jan. 26, 2015

(65) Prior Publication Data
US 2015/0218409 A1      Aug. 6, 2015

(30) Foreign Application Priority Data

Jan. 31, 2014   (JP) ................. 2014-017806

(51) Int. Cl.
| | |
|---|---|
| G02F 1/1337 | (2006.01) |
| C09K 19/20 | (2006.01) |
| C09K 19/24 | (2006.01) |
| C09K 19/38 | (2006.01) |
| B05D 3/06 | (2006.01) |
| C09D 135/02 | (2006.01) |

(52) U.S. Cl.
CPC .......... *G02F 1/133788* (2013.01); *B05D 3/067* (2013.01); *C08L 2312/06* (2013.01); *C09K 19/24* (2013.01); *C09K 2019/2035* (2013.01); *C09K 2019/2078* (2013.01)

(58) Field of Classification Search
CPC .............. G02F 1/133788; B05D 3/067; C09K 2219/03; C08L 2312/06
See application file for complete search history.

(56) References Cited

U.S. PATENT DOCUMENTS

2006/0177605 A1*   8/2006   Lub ................ C09K 19/46
                                                                428/1.3

FOREIGN PATENT DOCUMENTS

| JP | 5067964 | 8/2012 |
|---|---|---|
| JP | 5224261 | 3/2013 |

OTHER PUBLICATIONS

R. Sasaki et al., "Photoresponsive Behavior of Crosslinked Liquid-Crystalline Polymer Films with Different Spacer Length of Azobenzene Crosslinker", Proceedings of $60^{th}$ Symposium on Macromolecules, 2011, pp. 1-21.

* cited by examiner

*Primary Examiner* — Shean C Wu
(74) *Attorney, Agent, or Firm* — Wenderoth, Lind & Ponack, L.L.P.

(57) ABSTRACT

The present invention relates to a method for manufacturing a photo-responsive cross-linked liquid-crystalline polymer film, containing: a process of preparing a photopolymerizable monomer solution by dissolving in a solvent a polyfunctional liquid-crystalline monomer, a monofunctional liquid-crystalline monomer, a polyfunctional photo-responsive monomer and a photopolymerization initiator; a process of forming a photopolymerizable coating by applying the photopolymerizable monomer solution to a surface of an alignment film by means of a wet coating method and performing removal of the solvent; and a process of forming a film by photopolymerizing the monomers through light irradiation of the photopolymerizable coating under a non-oxygen atmosphere.

5 Claims, 3 Drawing Sheets

METHOD FOR MANUFACTURING PHOTO-RESPONSIVE CROSS-LINKED LIQUID-CRYSTALLINE POLYMER FILM

FIELD OF THE INVENTION

The present invention relates to a method for manufacturing a photo-responsive cross-linked liquid-crystalline polymer film.

BACKGROUND OF THE INVENTION

Liquid-crystalline polymer films having photo-responsivity are highly functional materials which combine anisotropy based on liquid crystallinity with moldability based on polymer, and researches on their applications have been actively carried out with the hope of practically utilizing such films in various fields.

For example, Non-Patent Document 1 reports the effect of an azobenzene crosslinking agent on molecular length in photo-induced movements of a liquid-crystalline polymer film.

Patent Document 1 discloses a photic driving actuator equipped with an element molded from a cross-linked liquid-crystalline polymer containing photochromic molecules capable of undergoing reversible isomerization when irradiated with ultraviolet light or visible light. Patent Document 2 discloses the photic driving rotor obtained by forming the molded cross-linked liquid-crystalline polymer as cited above into an endless-belt.

Traditional manufacturing of liquid-crystalline polymer films necessitates undergoing complicated processes as mentioned below.

Figure 2:
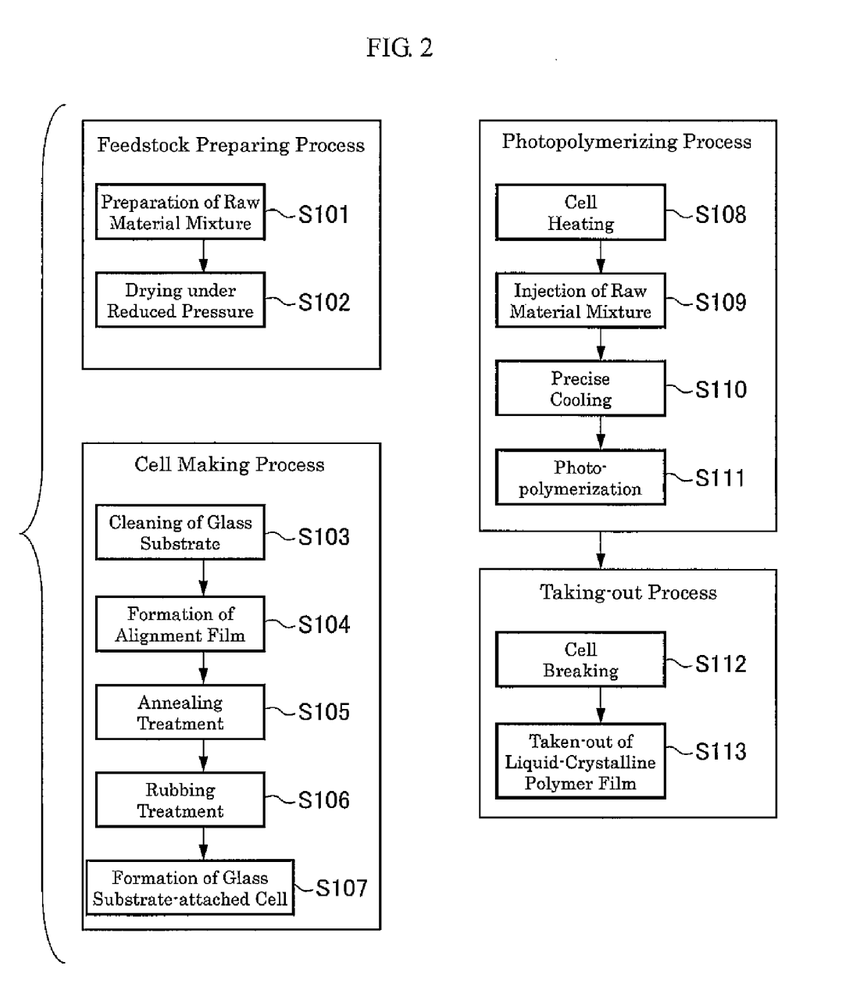
FIG. 2 is a flow process chart illustrating an outline of a traditional manufacturing method of a liquid-crystalline polymer film.

FIG. 2 is a flow process chart illustrating an outline of a traditional method for manufacturing a liquid-crystalline polymer film. The traditional method for manufacturing a liquid-crystalline polymer film has a feedstock preparing process, a cell making process, a photopolymerizing process and a taking-out process. In the feedstock preparing process, a mixture of raw materials containing a liquid-crystalline material, a photopolymerization initiator and so on is blended (S101), and then dried under reduced pressure (S102).

The thus obtained mixture of raw materials is usually in a powdery state, and it is used in the photopolymerizing process described below. In the cell making process performed separately from the feedstock preparing process, a glass substrate as a cell forming material is cleaned (S103), and thereon an alignment film is formed through application of a polyimide coating (S104). The alignment film obtained is subjected to annealing treatment (S105), and then to rubbing treatment (S106).

Two sheets of the thus made alignment film-attached glass substrate are prepared, and they are stuck together to make a cell (S107). In the subsequent photopolymerizing process, the cell obtained in the cell making process is heated first (S108), the powdery mixture of raw materials obtained in the feedstock preparing process is molten and injected into a gap between the two glass substrates of the heated cell with the aid of capillary action (S109), the cell is cooled as a fall in temperature is controlled exactly (S110), and then the feedstock is irradiated with light, thereby undergoing photopolymerization (S111). After the completion of the polymerization, the cell made up of the glass substrates is broken (S112), and the liquid-crystalline polymer film is taken out (S113).

Non-Patent Document 1: Ryuta Sasaki, Jun-ichi Mamiya, Motoi Kinoshita, Atsushi Shishido & Tomiki Ikeda, proceedings of 60th Symposium on Macromolecules (2011), entitled "Photoresponsive Behavior of Crosslinked Liquid-Crystalline Polymer Films with Different Spacer Length of Azobenzene Crosslinker"

Patent Document 1: Japanese Patent No. 5,224,261
Patent Document 2: Japanese Patent No. 5,067,964

SUMMARY OF THE INVENTION

The traditional manufacturing of liquid-crystalline polymer films as mentioned above has the following problems. (1) Considering that substantial efforts and a long time (about 2 days) are required for manufacturing, only a small quantity of film is obtained. (2) Continuous production is difficult. (3) Due to the fact that glass substrates are used, it is difficult to aim at increase in area of film to be formed. (4) Because a mixture of raw materials is injected into a gap between two glass substrates of a cell with the aid of capillarity, it is difficult to control the thickness of film to be formed.

An object of the invention is therefore to provide a method for manufacturing a photo-responsive cross-linked liquid-crystalline polymer, which method allows continuous manufacturing of a larger-area film while solving the above-mentioned problems of traditional arts, resolving the complexity of manufacturing procedures and achieving simple, short-time and satisfactory control of film thickness.

We, the present inventors, have continued our intensive studies, from which we have found that the foregoing problems can be solved by adopting a process of applying a photopolymerizable monomer solution to the surface of an alignment film by means of a wet coating method, and thereby completion of the invention can be achieved.

That is, the present invention contains the following 1 to 7.

1. A method for manufacturing a photo-responsive cross-linked liquid-crystalline polymer film, containing:
   a process of preparing a photopolymerizable monomer solution by dissolving in a solvent a polyfunctional liquid-crystalline monomer, a monofunctional liquid-crystalline monomer, a polyfunctional photo-responsive monomer and a photopolymerization initiator;
   a process of forming a photopolymerizable coating by applying the photopolymerizable monomer solution to a surface of an alignment film by means of a wet coating method and performing removal of the solvent; and
   a process of forming a film by photopolymerizing the monomers through light irradiation of the photopolymerizable coating under a non-oxygen atmosphere.

2. The method for manufacturing a photo-responsive cross-linked liquid-crystalline polymer film according to the above 1, in which the polyfunctional photo-responsive monomer is a polyfunctional photo-responsive monomer containing an azobenzene structure.

3. The method for manufacturing a photo-responsive cross-linked liquid-crystalline polymer film according to the above 1 or 2, in which the process of forming the film is performed under an atmosphere of nitrogen gas.

4. The method for manufacturing a photo-responsive cross-linked liquid-crystalline polymer film according to the above 3, in which the process of forming the film is performed without covering the photopolymerizable coating with a cover material.

5. The method for manufacturing a photo-responsive cross-linked liquid-crystalline polymer film according to any one of the above 1 to 4, containing:
   a process of preparing the photopolymerizable monomer solution;
   a process of forming the photopolymerizable coating by providing an alignment film having an area of at least 25 cm$^2$ on a substrate, applying the photopolymerizable monomer solution to a surface of the alignment film by means of a wet coating method and performing removal of the solvent; and a process of forming the film having an area of at least 25 cm$^2$ by light irradiation of the photopolymerizable coating under a non-oxygen atmosphere and thereby photopolymerizing the monomers.

6. A photo-responsive cross-linked liquid crystalline polymer film having an area of at least 25 cm$^2$ and containing as monomeric units at least a polyfunctional liquid-crystalline monomer, a monofunctional liquid-crystalline monomer and a polyfunctional photo-responsive monomer.

7. The photo-responsive cross-linked liquid-crystalline polymer film according to the above 6, in which the polyfunctional photo-responsive monomer is a polyfunctional photo-responsive monomer containing an azobenzene structure.

In the manufacturing method according to the present invention, a photopolymerizable film formed notably through the application of a photopolymerizable monomer solution to a surface of an alignment film by means of a wet coating method is subjected to photopolymerization, and therefore no glass substrate is required in contrast to traditional arts, and besides, not only control of the photopolymerizable film and its forming speed becomes easy but also the area of film to be formed can be made larger.

Thus, according to the present invention, it becomes possible to provide a manufacturing method of a photo-responsive cross-linked liquid-crystalline polymer film, which method allows continuous manufacturing of a larger-area film while resolving complexity of manufacturing procedures and achieving simple, short-time, satisfactory control of film thickness.

According to an embodiment where a polyfunctional photo-responsive monomer having an azobenzene structure is used, it becomes possible to continuously manufacturing a large-area photofunctional material capable of converting light energy into kinetic energy while achieving simple, short-time, satisfactory control of film thickness.

In particular, a mixture of polymerizable monomers containing a polyfunctional photo-responsive monomer having an azobenzene structure is low in degree of freedom of liquid-crystalline molecules in a solution state and it is hart to make the liquid-crystalline molecules align in a desired direction. Therefore a wet coating method is hard to adopt, and it has been a technical common sense to adopt the processes, as shown in FIG. 2, including a feedstock preparing process, a cell making process, a photopolymerizing process and a taking-out process. However, our study has found that a wand thereby the remarkable effects as mentioned above can be produced.

According to another embodiment where the film forming process is performed in an atmosphere of nitrogen gas, it becomes possible to prepare the non-oxygen atmosphere at low cost.

According to still another embodiment where the film forming process is performed without covering the photopolymerizable coating with a cover material, further reduction in time, labor and cost attendant on forming the film can be achieved. The traditional arts have a problem that full alignment of liquid-crystalline molecules cannot be secured without using any cover material (without surrounding both sides of the photopolymerizable film with alignment films). However, to our surprise we have found that, even when the covering with a cover material is omitted (an alignment film is used on one side alone), full alignment of liquid-crystalline molecules can be achieved by applying a photopolymerizable monomer solution to a surface of an alignment film by means of a wet coating method.

Further, when a photopolymerizable film is covered with a cover material as in traditional arts, there develops oxygen residue traceable to unevenness of liquid-crystalline molecules and this oxygen residue inhibits photopolymerization reaction even when the reaction is conducted in a non-oxygen atmosphere. However, in the above-mentioned embodiment of the present invention, such an adverse effect of oxygen residue can be prevented.

According to another embodiment where an alignment film having an area of 25 cm$^2$ or more is provided on a substrate and on the alignment film is formed a photopolymerizable coating, it becomes possible to manufacture a photo-responsive cross-linked liquid-crystalline polymer film having a large area of 25 cm$^2$ or more.

MODES FOR CARRYING OUT THE INVENTION

The present invention is described below in further detail.
(Process of Preparing Photopolymerizable Monomer Solution)

The photopolymerizable monomer solution used in the present invention is obtained by dissolving in a solvent a polyfunctional liquid-crystalline monomer, a monofunctional liquid-crystalline monomer, a polyfunctional photo-responsive monomer and a photopolymerization initiator.

Examples of compounds suitable as such monomers include those having not only polymerizable groups at their respective molecular ends but also mesogenic groups containing cyclic units and so on. Examples of a cyclic unit included in a mesogenic group include a biphenyl-based unit, a phenylbenzoate-based unit, a phenylcyclohexane-based unit, an azoxybenzene-based unit, an azomethine-based unit, an azobenzene-based unit, a phenylpyrimidine-based unit, a diphenylacetylene-based unit, a diphenylbenzoate-based unit, a bicyclohexane-based unit, a cyclohexylbenzene-based unit, and a terphenyl-based unit. The ends of these units may have substituents, such as a cyano group, an alkyl group, an alkoxy group and a halogen atom.

Such polymerizable end group and mesogenic group in each monomer may be united via a spacer moiety capable of imparting flexibility to the monomer. Examples of such a spacer moiety include a polymethylene chain and a polyoxymethylene chain. The number of repeated structural units forming the spacer moiety is determined as appropriate depending on the chemical structure of a mesogenic moiety. Specifically, the number of repeated structural units in the polymethylene chain is preferably from 0 to 20, and more preferably from 2 to 12, and that in the polyoxymethylene chain is preferably from 0 to 10, and more preferably from 1 to 3.

Examples of functional groups contained in those monomers include polymerizable groups, such as a (meth)acryloyloxy group, a (meth)acrylamido group, a vinyloxy group, a vinyl group, and an epoxy group. Of these groups, a (meth)

acryloyloxy group and a (meth)acrylamido group are preferred because they can be polymerized with ease.

In point of effects of the present invention, the polyfunctional liquid-crystalline monomer and the monofunctional liquid-crystalline monomer are preferably phenyl benzoate-based compounds.

The polyfunctional liquid-crystalline monomers in this embodiment can be represented e.g. by the following formula (1).

(1)

In formula (1), n represents an integer of 3 to 9, preferably an integer of 4 to 8, and more preferably an integer of 5 to 7.

One of such polyfunctional liquid-crystalline monomers, e.g. 1,4-bis[4-(6-acryloyloxyhexyloxyl)benzoyloxy]-2-methylbenzene [the compound represented by formula (1) where n is 6, hereinafter abbreviated as "C6A"], can be synthesized e.g. under the following scheme.

That is, ethyl p-hydroxybenzoate is subjected to Williamson ether synthesis to produce Compound 1, the Compound 1 is subjected to deprotection reaction to produce Compound 2, the Compound 2 is subjected to Schotten-Baumann reaction to produce Compound 3, and finally the Compound 3 is subjected to dehydration condensation with methylhydroquinone to yield C6A.

The monofunctional liquid-crystalline monomers in this embodiment can be represented e.g. by the following formula (2).

(2)

In formula (2), n represents an integer of 3 to 9, preferably an integer of 4 to 8, and more preferably an integer of 5 to 7.

One of such monofunctional liquid-crystalline monomers, e.g. 4-hexyloxyphenyl 4-(6-acryloyloxyhexyloxyl)benzoate [the compound represented by formula (2) where n is 6, hereinafter abbreviated as "A6BZ6"], can be synthesized e.g. under the following scheme.

That is, hydroquinone is subjected to Williamson ether synthesis to produce Compound 4, and the Compound 4 is subjected to dehydration condensation with the Compound 3 synthesized according to the foregoing synthesis scheme for C6A to yield A6BZ6.

Compound 4

Compound 1

Compound 2   Compound 3

C6A and they are restored to their original trans-isomers when irradiated with visible light having wavelengths of the order of 500 nm to 650 nm and the isomerization of azobenzene compounds can cause a great change in intermolecular distance.

Of the azobenzene compounds, azobenzene structure-containing polyfunctional photo-responsive monomers represented by the following formula are preferable in point of effects the present invention.

(3)

In formula (3), n represents an integer of 1 to 6, preferably an integer of 2 to 5, and more preferably an integer of 3 or 4.

One of such polyfunctional photo-responsive monomers, e.g. 4,4'-bis[3-(acryloyloxy)propyloxy]azobenzene [the compound represented by formula (3) where n is 3, hereinafter abbreviated as "DA3AB"], can be synthesized e.g. under the following scheme.

That is, p-nitrophenol is subjected to Williamson ether synthesis to produce Compound 5, the compound 5 is converted to Compound 6 by reduction, the Compound 6 is subjected to azo coupling to produce Compound 7, the Compound 7 is further subjected to Williamson ether synthesis to produce Compound 8, and finally the Compound 8 is subjected to Schotten-Baumann reaction to yield DA3AB.

As to the polyfunctional photo-responsive monomer, any of publicly known ones can be used and there is no particular restriction. Examples of such a monomer include those having azobenzene, stilbene or like structures capable of undergoing cis-trans isomerization and those having spiropyran, diaryl or like structures capable of undergoing ring opening-ring closing photoisomerization. Of these monomers, azobenzene compounds each containing the azobenzene structure represented by the formula shown below are especially preferred. This is because, depending on substituents bonded to azobenzene structures, when irradiated with ultraviolet light having wavelengths of the order of 300 nm to 400 nm, azobenzene compounds undergo isomerization from their rod-shaped trans-isomers to their bending cis-isomers, Examples of a solvent in which the foregoing monomers of various types are dissolved include halogenated hydrocarbons, such as chloroform, dichloromethane, carbon tetrachloride, dichloroethane, tetrachloroethane, methylene chloride, trichloroethylene, tetrachloroethylene, chlorobenzene and o-dichlorobenzene; phenols, such as phenol, p-chlorophenol, o-chlorophenol, m-cresol, o-cresol and p-cresol; aromatic hydrocarbons, such as benzene, toluene, xylene, methoxybenzene and 1,2-dimethoxybenzene; ketone solvents, such as acetone, methyl ethyl ketone (MEK), methyl isobutyl ketone, cyclohexanone, cyclopentanone, 2-pyrrolidone and N-methyl-2-pyrrolidone; ester solvents, such as ethyl acetate and butyl acetate; alcohol solvents, such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide solvents, such as dimethylformamide and dimethylacetamide; nitrile solvents, such as acetonitrile and butyronitrile; ether solvents, such as diethyl ether, dibutyl ether, tetrahydrofuran and dioxane; carbon disulfide, ethyl cellosolve, and butyl cellosolve. These solvents may be used alone or as combinations of any two or more thereof.

Examples of the photopolymerization initiator include benzoin ether base photopolymerization initiators, acetophenone base photopolymerization initiators, α-ketol base photopolymerization initiators, aromatic sulfonyl chloride base photopolymerization initiators, photo-activated oxime base photopolymerization initiators, benzoin base photopolymerization initiators, benzyl base photopolymerization initiators, benzophenone base photopolymerization initiators, ketal base photopolymerization initiators, thioxanthone base photopolymerization initiators, acylphosphine oxide base photopolymerization initiators, and titanocene base photopolymerization initiators. These photopolymerization initiators can be used alone or as combinations of any two or more thereof.

More specifically, examples of a benzoin ether base photopolymerization initiator include benzoin methyl ether, benzoin ethyl ether, benzoin propyl ether, benzoin isopropyl ether, and benzoin isobutyl ether.

Examples of an acetophenone base photopolymerization initiator include 1-hydroxycyclohexyl phenyl ketone (e.g. IRUGACURE 184, trade name, a product of Ciba Specialty Chemicals Inc.), 2,2-diethoxyacetophenone, 2,2-dimethoxy-2-phenylacetophenone, 4-phenoxydichloroacetophenone, and 4-(t-butyl)dichloroacetophenone.

Examples of an α-ketol base photopolymerization initiator include 2-methyl-2-hydroxypropiophenone and 1-[4-(2-hydroxyethyl)phenyl]-2-methylpropane-1-one.

Examples of an aromatic sulfonyl chloride base photopolymerization initiator include 2-naphthalenesulfonyl chloride.

Examples of a photo-activated oxime base photopolymerization initiator include 1-phenyl-1,1-propanedione-2-(o-ethoxycarbonyl)-oxime. Examples of a benzoin base photopolymerization initiator include benzoin. Examples of a benzyl base photopolymerization initiator include benzyl.

Examples of a benzophenone base photopolymerization initiator include benzophenone, benzoyl benzoate, 3,3'-dimethyl-4-methoxybenzophenone, polyvinyl benzophenone, and α-hydroxycyclohexyl phenyl ketone.

Examples of a ketal base photopolymerization initiator include 2,2-dimethoxy-1,2-diphenylethane-1-one [e.g. IRUGACURE 651, trade name, a product of Ciba Specialty Chemicals Inc.].

Examples of a thioxanthone base photopolymerization initiator include thioxanthone, 2-chlorothioxanthone, 2-methylthioxanthone, 2,4-dimethylthioxanthone, isopropylthioxanthone, 2,4-diisopropylthioxanthone, and dodecylthioxanthone.

Examples of an acylphosphine oxide base photopolymerization initiator include LUCIRIN TPO, trade mane, a product of BASF. Examples of a titanocene base photopolymerization initiator include IRUGACURE 784, trade name, a product of BASF.

In the photopolymerizable monomer solution to be used in the present invention, a blending ratio among (a) polyfunctional liquid-crystalline monomer, (b) monofunctional liquid-crystalline monomer and (c) polyfunctional photo-responsive monomer may be determined with consideration given to the desired domain size (e.g. 0.5 µm or greater) or cross-link density. For instance, it is appropriate to blend (a) in a proportion of 30 mol % to 70 mol %, (b) in a proportion of 10 mol % to 50 mol % and (c) in a proportion of 10 mol % to 40 mol %.

A blending proportion of the photopolymerization initiator is e.g. from 1 mol % to 10 mol % and preferably from 2 mol % to 5 mol %, with respect to the total mole number of functional groups (polymerizable groups) contained in the monomers (a), (b) and (c).

Additionally, publicly known additives of various kinds, including a leveling agent and so on, can be blended into the photopolymerizable monomer solution as needed.

In the photopolymerizable monomer solution to be used in the invention, it is also appropriate that (a) polyfunctional liquid-crystalline monomer, (b) monofunctional liquid-crystalline monomer, (c) polyfunctional photo-responsive monomer, a photopolymerization initiator and, if required, additives be dissolved in a solvent in a concentration of e.g. 0.01 mass % to 0.20 mass % and preferably 0.02 mass % to 0.10 mass %.

(Process of Forming Photopolymerizable Coating)

The process of forming a photopolymerizable coating is a process of applying the photopolymerizable monomer solution to a surface of an alignment film by means of a wet coating method.

As to the wet coating method, it is possible to arbitrarily chose an appropriate method and adopt it. Examples thereof include a roll coating method, a spin coating method, a wire-bar coating method, a dip coating method, a die coating method, a curtain coating method, a spray coating method, and a knife coating method (e.g. comma coating method).

As to the alignment film, there is no particular restriction, but the preferred are films highly wettable with the photopolymerizable monomer solution and capable of aligning the polyfunctional liquid-crystalline monomer and the monofunctional liquid-crystalline monomer in a particular direction.

Examples of such an alignment film include alignment films formed by coating polyamide, polyimide, lecithin, silica, polyvinyl alcohol, ester-modified polyvinyl alcohol, polyvinyl acetate saponified to a controlled degree, a silane coupling agent or so on. Alternatively, the surface of the substrate may be subjected to rubbing treatment as it is.

Examples of a method for alignment treatment include rubbing treatment, oblique vapor deposition treatment, a microgroove method, and a polymer film stretch method. Of these alignment treatments, rubbing treatment is preferably adopted in point of easiness of manufacturing operation or high uniformity of alignment.

The coating thickness is e.g. from 0.5 µm to 5.0 µm and preferably from 0.8 µm to 2.0 p.m. The coating formed is preferably dried. In the case of using an aqueous solution of polyvinyl alcohol for forming the coating, drying temperature is e.g. from 80° C. to 120° C. and drying time is e.g. from 60 seconds to 240 seconds.

(Process of Forming Film)

In the process of forming a film, the photopolymerizable coating is irradiated with light under a non-oxygen atmosphere, thereby polymerizing photopolymerizable monomers.

The term non-oxygen atmosphere used in the present invention signifies an atmosphere containing substantially no oxygen. For example, the oxygen concentration is preferably 500 ppm or lower, more preferably 200 ppm or lower, and further preferably 100 ppm or lower. Above all, it is preferable to form a film under an atmosphere of nitrogen gas from the viewpoint of preparing the non-oxygen atmosphere at low cost.

Where the irradiation with light is concerned, it is essential only that the photopolymerization initiator be activated by the irradiation to induce reaction of monomeric ingredients. As a device for energy-ray irradiation, traditional ones can be used. In the case of e.g. ultraviolet irradiation, use can be made of a mercury lamp, a fluorescent lamp, a sodium lamp, a metal halide lamp, a xenon lamp, a neon tube, a neon lamp, or a high-intensity discharge lamp.

According to the present invention, it is possible to polymerize photopolymerizable monomers without covering the photopolymerizable coating with a cover material. Thereby further reductions in time, labor and cost attendant on forming film can be accomplished. On the other hand, traditional arts have the problem that they cannot ensure proper alignment of liquid-crystalline molecules unless both sides of a polymerizable layer are surrounded with a cover material.

However, the present invention has proven that, even when covering with a cover material is omitted (an alignment film is used on one side alone), proper alignment of liquid-crystalline molecules can be accomplished. In addition, although covering a photopolymerizable layer with a cover material in traditional arts leaves residual oxygen owing to unevenness of liquid-crystalline molecules and this residual oxygen inhibits photopolymerization reaction even though the state of a non-oxygen atmosphere is provided after the covering, the invention allows prevention of adverse effects of such residual oxygen.

The present invention can provide a photo-responsive cross-linked liquid-crystalline polymer film having an unprecedented large area of 25 cm$^2$ or more.

For forming a photo-responsive cross-linked liquid-crystalline polymer film having such a large area, it is essential only to perform a process of providing an alignment film having an area of 25 cm$^2$ or more on a substrate and forming a photopolymerizable coating on the alignment film and a process of forming the intended film from the coating.

Examples of a material of the substrate include general-purpose polymers, such as triacetyl cellulose (TAC), polyethylene, polypropylene, polyethylene terephthalate, polycarbonate, and cycloolefin polymers, and other known materials, such as elastomers, silicone rubber, thin metallic films, and paper. The alignment film and the substrate have no particular restrictions as to their shapes.

Figure 1:
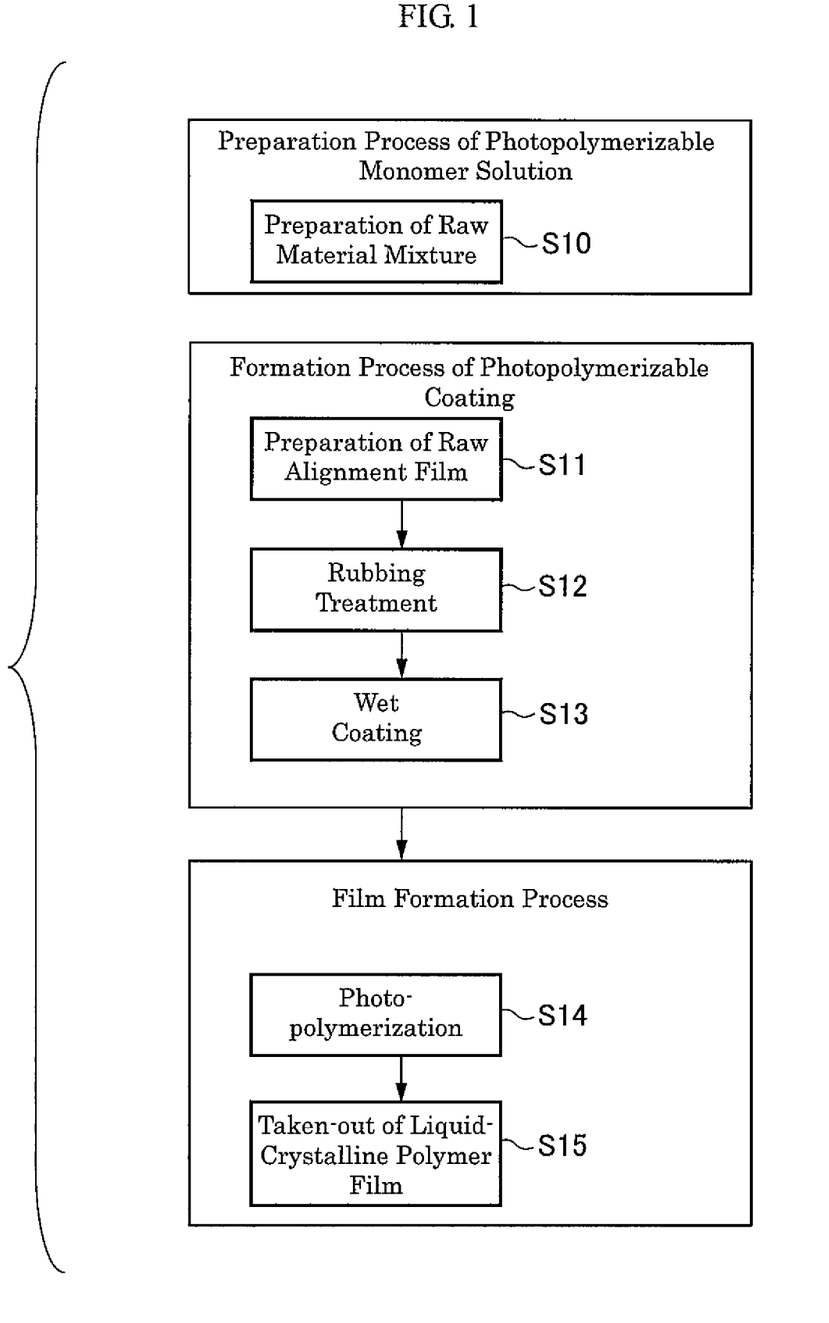
FIG. 1 is a flow process chart illustrating an outline of the manufacturing method according to the present invention.

FIG. 1 is a flow process chart illustrating an outline of the manufacturing method according to the present invention, described above. In the process of preparing a photopolymerizable monomer solution, a polyfunctional liquid-crystalline monomer, a monofunctional liquid-crystalline monomer, a polyfunctional photo-responsive monomer, and a photopolymerization initiator are dissolved in a solvent to prepare a raw material mixture (S10). In the subsequent process of forming a photopolymerizable coating, an alignment film is prepared (S11) and subjected to rubbing treatment (S12), and then the raw material mixture prepared in advance is put on the rub-treated alignment film by means of a wet coating method to form a photopolymerizable coating (S13). In the process of forming a film, the photopolymerizable coating is irradiated with light under a non-oxygen atmosphere to photopolymerize the monomers (S14), and the thus formed film is taken out (S15).

In this way, the manufacturing method according to the present invention solves the problems in the traditional manufacturing process of a liquid-crystalline polymer film as shown in FIG. 2, and achieves effects of allowing (1) short-time (e.g. twenty and several minutes') manufacturing, (2) continuous manufacturing, (3) increase in area of film to be manufactured, and (4) easy control of film thickness owing to adoption of a wet coating method.

Figure 3:
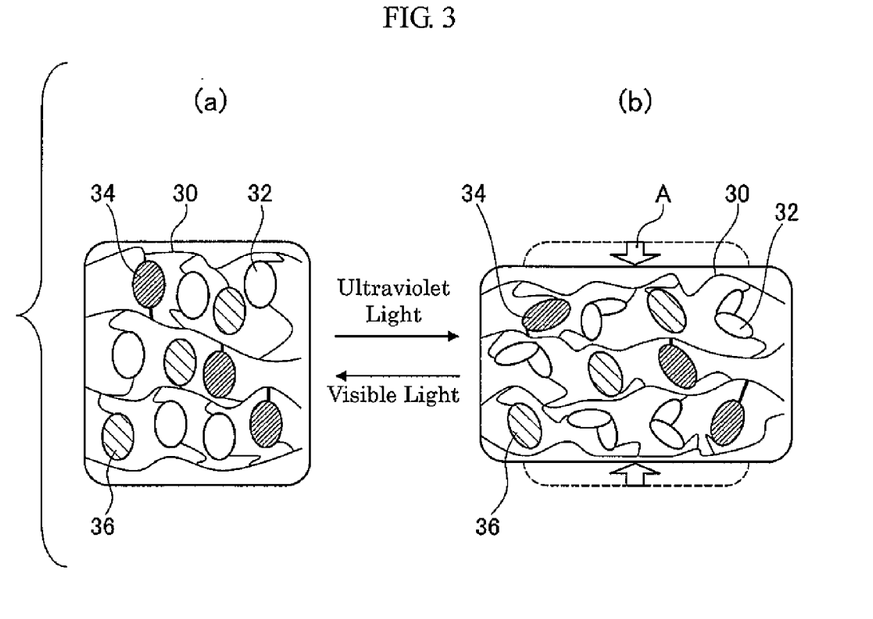
FIG. 3 is diagram for explaining structures of the film obtained by the present invention.

In the photo-responsive cross-linked liquid-crystalline polymer film according to the present invention, there exist domains that are alignment-possible regions of mesogens as hard core portions directly concerned in alignment of liquid-crystalline molecules, and skeletons of polymer molecules form a three-dimensional reticulate structure as illustrated in FIG. 3. Thereby, the aligned mesogens are tied gently in a polymer matrix and there develops a structure allowing a strong correlation between movements of polymer skeletons and alignment of mesogens. The cross-linked structure is preferably a structure allowing retention of an orientation order over a great distance.

As described above, in the case of adopting a monomer 32 containing an azobenzene structure as the polyfunctional photo-responsive monomer, when irradiating the monomer 32 with ultraviolet light, the monomer 32 is isomerized from its rod-shaped trans-isomer as illustrated in (a) of FIG. 3 to its bending cis-isomer as illustrated in (b) of FIG. 3. The isomerized azobenzene is restored to its original trans-isomer by irradiation with visible light. By the isomerization from the trans-isomer to the cis-isomer, orientation order of mesogens is degraded to result in induction of anisotropic shrinkage as indicated by the arrow A. In FIG. 3, the numeral 34 represents a polyfunctional liquid-crystalline monomer and the numeral 36 represents a monofunctional liquid-crystalline monomer.

EXAMPLES

The present invention will now be illustrated in further detail by reference to the following examples, but these examples should not be construed as limiting the scope of the invention in any way.

Example 1

Process of Preparing Photopolymerizable Monomer Solution

The following ingredients including various monomers were used in preparing a photopolymerizable monomer solution.

Polyfunctional liquid-crystalline monomer: C6A (produced under the reaction scheme mentioned hereinbefore)

Monofunctional liquid-crystalline monomer: A6BZ6 (produced under the reaction scheme mentioned hereinbefore)

Polyfunctional photo-responsive monomer: DA3AB (produced under the reaction scheme mentioned hereinbefore)

Photopolymerization initiator: Titanocene photopolymerization initiator represented by the following formula, IRUGACURE 784, trade name, a product of BASF Solvent: Tetrahydrofuran (THF)
Additive: Leveling agent, BYK361, trade name, a product of BYK-Chemie GmbH In the photopolymerizable monomer solution, the blending ratio between the polyfunctional liquid-crystalline monomer, the monofunctional liquid-crystalline monomer and the polyfunctional photo-responsive monomer was set to 60:20:20 (by mol %). The photopolymerization initiator was blended in a proportion of 2 mol % with respect to the total molar number of functional groups (polymerizable groups) of the monomers. The leveling agent was blended in a proportion of 0.05 mass % with respect to the photopolymerizable monomer solution as a whole. These ingredients were dissolved in THF so that the total concentration thereof reached 15 mass %, stirred for one hour with a stirrer. In this manner, the intended photopolymerizable monomer solution was prepared.

Details of each ingredient blended in the photopolymerizable monomer solution are shown below.

TABLE 1

| | Chemical formula | Molecular weight (molar mass) [g/mol] | Molar ratio [mol %] | Amount blended mg | Amount blended wt % | Molar number [mol] | Molar number of polymerizable groups [mol] |
|---|---|---|---|---|---|---|---|
| DA3AB | $C_{24}H_{20}N_2O_6$ | 432.42 | 20 | 200.0 | 2.2 | $4.63 \times 10^{-4}$ | $9.25 \times 10^{-4}$ |
| C6A | $C_{39}H_{44}O_{10}$ | 672.74 | 60 | 933.5 | 10.0 | $1.39 \times 10^{-3}$ | $2.78 \times 10^{-3}$ |
| A6BZ6 | $C_{28}H_{36}O_6$ | 468.57 | 20 | 216.7 | 2.3 | $4.63 \times 10^{-4}$ | $4.63 \times 10^{-4}$ |
| IRGACURE784 | | 534.0 | 2 | 44.5 | 0.5 | $8.33 \times 10^{-5}$ | |
| THF | | | | 7,900.0 | 84.9 | | |
| BYK361 | | | | 4.6 | 0.05 | | |

(Process of Forming Photopolymerizable Coating)

TAC (40 μm-thick triacetyl cellulose film, manufactured by Fujifilm Corporation) was saponified and used as a substrate.

To the saponified TAC, an aqueous solution of polyvinyl alcohol (PVA) (a 5 wt % aqueous solution of VC-10, completely saponified type, a product of JVP (JAPAN VAM & POVAL CO., LTD.)) was applied by means of a wire bar #5 to form a coating. The coating formed was put in a dry oven on the condition of 100° C. for 3 minutes, and thereby it was dried. Thus a PVA film was formed on the TCA. The PVA film was subjected to such rubbing treatment that the surface thereof was rubbed 5 times in one direction with a rayon cloth, thereby providing an alignment film capable of aligning liquid-crystalline molecules. In addition, static removal treatment was given to the TAC and the PVC film by means of ionizer SJ-F305, a product of KEYENCE CORPORATION, for the purpose of preventing the films from repelling the photopolymerizable monomer solution at the occasion of subsequent wet coating.

Then, the photopolymerizable monomer solution was applied to the surface of the PVA alignment film by means of a wire bar #4 in the 20° C. atmosphere, and dried in a dry oven on the condition of 50° C. for 3 minutes. Thus a photopolymerizable film (a laminate of the TAC, the PVC film and the photopolymerizable coating) was obtained. The cross section of the film in a dry state (after forming the film) after completion of polymerization was observed under a scanning electron microscope (SEM), and thereby the thickness of the coating having undergone photopolymerization was found to be 350 nm.

(Process of Forming Film)

Next the laminate of the TAC, the PVC film and the photopolymerizable coating was placed in a purge box having undergone a purge of air by nitrogen (oxygen concentration≤100 ppm) and the photopolymerizable coating was irradiated for about 30 minutes with an extra-high voltage mercury lamp (UV-CURE 850, manufactured by JAPAN TECHNOLOGY SYSTEM Corporation) whose power was adjusted so as to ensure an irradiation energy density of 2 to 3 mW/cm$^2$ at the irradiated surface, under the condition that light having wavelength of from 500 nm to 600 nm could selectively transmit via wavelength filters (a 0.3 mm-thick longpass filter, OG530, manufactured by SHIBUYA OPTICAL CO., LTD. and a 2 mm-thick heat-wave absorption filter, KG5, manufactured by SHIBUYA OPTICAL CO., LTD.). In this way, the monomers in the coating were photopolymerized, thereby forming an intended film having a size of 200 mm by 300 mm.

The film obtained was evaluated as follows.

(1) Optical Property (1-1) By measurements with a haze meter, it was ascertained that the film was a highly transparent and oriented film having a transmittance of 90.4% at a wavelength of 590 nm and transparency equivalent to a haze of 0.8%.

(1-2) By measurements with Axoscan (a birefringence measurement system manufactured by AXOMETRICS Inc.), it was ascertained that the film exhibited such birefringence as to make a front phase difference $R_0$ of 120 nm, and thereby alignment of liquid-crystalline molecules was verified.

(2) Thermal Property (2-1) By measurements made on the film with DSC (a differential scanning calorimetric system), it was ascertained that a peak of Tg (glass transition temperature) derived from polymerized products appeared at 45° C., thereby verifying the occurrence of polymerization reaction in the present manufacturing method.

Comparative Example 1

Manufacturing of film was carried out in accordance with the traditional art illustrated in FIG. 2, thereby providing a photo-responsive cross-linked liquid-crystalline film exhibiting properties comparable to those of the film manufactured in Example 1. Therein, however, manufacturing the film took a long time (a time at least 25 hours longer than the time required in Example 1), and besides, the film manufactured had a small size of 10 mm×10 mm. The film obtained was therefore deficient in practicality.

Example 2

Manufacturing a film was tried under the same conditions as in Example 1, except that a laminate of the TAC substrate and the PVA alignment film to which rubbing and static removal treatment had been given was used as a cover material and, after applying and drying the polymerizable monomer coating, the polymerizable monomer coating was covered with the cover material so that the surface of the PVA alignment film was brought to face-to-face contact with the surface of the coating. In some cases, however, air bubbles (oxygen) intruded at the time of lamination of the cover material inhibited the photopolymerization reaction. Therefore consideration had to be given to producing a photo-responsive cross-linked liquid crystalline polymer in a fully-advanced state of polymerization reaction.

Comparative Example 2

When manufacturing a film was tried under the same conditions as in Example 1, except that the purge of air with nitrogen was not carried out, oxygen in the atmosphere inhibited the photopolymerization to result in failure to obtain a photo-responsive cross-linked liquid crystalline polymer film in a fully-advanced state of polymerization reaction.

While the present invention has been described in detail and referring to specific embodiments, it is apparent for those skilled in the art that various modifications or changes can be made without departing from the spirit and scope of the present invention.

The present application is based on Japanese Patent Application No. 2014-017806 filed on Jan. 31, 2014, and the contents thereof are incorporated herein by reference.

Also, all the references cited herein are incorporated as a whole.

INDUSTRIAL APPLICABILITY

The manufacturing method according to the present invention allows continuous manufacturing a larger-area film of photo-responsive cross-linked liquid-crystalline polymer while resolving complexity of manufacturing procedures and achieving a simple, short-time and satisfactory control of film thickness, and the film obtained are useful e.g. as members of an actuator, a plastic motor, a micro channel (valve), a robot arm, and so on.

DESCRIPTION OF REFERENCE NUMERALS AND SIGNS

30: Three-dimensional reticular structure
32: Monomer containing an azobenzene structure
34: Polyfunctional liquid-crystalline monomer
36: Monofunctional liquid-crystalline monomer

The invention claimed is:
1. A method for manufacturing a photo-responsive cross-linked liquid-crystalline polymer film, comprising:
a process of preparing a photopolymerizable monomer solution by dissolving in a solvent a polyfunctional liquid-crystalline monomer of formula (1), a monofunctional liquid-crystalline monomer of formula (2), a polyfunctional photo-responsive monomer of formula (3) and a photopolymerization initiator:

(1)

wherein in formula (1), n represents an integer of 3 to 9;

(2)

wherein in formula (2), n represents an integer of 3 to 9; and (3)

wherein in formula (3), n represents an integer of 1 to 6;
a process of forming a photopolymerizable coating by applying the photopolymerizable monomer solution to a surface of an alignment film by means of a wet coating method and performing removal of the solvent; and
a process of forming a film by photopolymerizing the monomers through light irradiation of the photopolymerizable coating under a non-oxygen atmosphere.

2. The method for manufacturing a photo-responsive cross-linked liquid-crystalline polymer film according to claim 1, wherein the process of forming the film is performed under an atmosphere of nitrogen gas.

3. The method for manufacturing a photo-responsive cross-linked liquid-crystalline polymer film according to claim 2, wherein the process of forming the film is performed without covering the photopolymerizable coating with a cover material.

4. The method for manufacturing a photo-responsive cross-linked liquid-crystalline polymer film according to claim 1, comprising:
a process of preparing the photopolymerizable monomer solution;
a process of forming the photopolymerizable coating by providing an alignment film having an area of at least 25 cm² on a substrate, applying the photopolymerizable monomer solution to a surface of the alignment film by means of a wet coating method and performing removal of the solvent; and
a process of forming the film having an area of at least 25 cm² by light irradiation of the photopolymerizable coating under a non-oxygen atmosphere and thereby photopolymerizing the monomers.

5. A photo-responsive cross-linked liquid crystalline polymer film having an area of at least 25 cm² and comprising as monomeric units at least a polyfunctional liquid-crystalline monomer of formula (1), a monofunctional liquid-crystalline monomer of formula (2) and a polyfunctional photo-responsive monomer of formula (3):

(1)

wherein in formula (1), n represents an integer of 3 to 9;

(2)

wherein in formula (2), n represents an integer of 3 to 9; and (3)

wherein in formula (3), n represents an integer of 1 to 6.

* * * * *